(12) United States Patent
Parlar et al.

(10) Patent No.: US 6,978,838 B2
(45) Date of Patent: Dec. 27, 2005

(54) METHOD FOR REMOVING FILTER CAKE FROM INJECTION WELLS

(75) Inventors: Mehmet Parlar, Sugar Land, TX (US); Mark Brady, Sugar Land, TX (US); Liz Morris, Aberdeen (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 373 days.

(21) Appl. No.: 10/249,235

(22) Filed: Mar. 25, 2003

(65) Prior Publication Data

US 2004/0014606 A1 Jan. 22, 2004

Related U.S. Application Data

(60) Provisional application No. 60/397,188, filed on Jul. 19, 2002.

(51) Int. Cl.[7] ............................................. E21B 37/06
(52) U.S. Cl. ...................... 166/311; 166/304; 507/201; 507/269; 507/277
(58) Field of Search ..................... 166/311, 304, 305.1, 166/278; 507/201, 929–931, 267, 277

(56) References Cited

U.S. PATENT DOCUMENTS

| | | | |
|---|---|---|---|
| 4,945,991 A | 8/1990 | Jones | 166/278 |
| 5,082,052 A | 1/1992 | Jones et al. | 166/51 |
| 5,113,935 A | 5/1992 | Jones et al. | 166/51 |
| 5,126,051 A | 6/1992 | Shell et al. | 210/632 |
| 5,165,477 A | 11/1992 | Shell et al. | 166/291 |
| 5,341,880 A | 8/1994 | Thorstensen et al. | 166/278 |
| 5,419,394 A | 5/1995 | Jones | 166/51 |
| 5,435,391 A | 7/1995 | Jones | 166/308 |
| 5,476,143 A | 12/1995 | Sparlin et al. | 166/233 |
| 5,515,915 A | 5/1996 | Jones et al. | 166/51 |
| 5,881,813 A | 3/1999 | Brannon et al. | 166/304 |
| 5,909,774 A * | 6/1999 | Griffith et al. | 166/312 |
| 6,140,277 A | 10/2000 | Tibbles et al. | 507/201 |
| 6,143,698 A * | 11/2000 | Murphey et al. | 507/145 |
| 6,220,345 B1 | 4/2001 | Jones et al. | 166/51 |
| 6,263,967 B1 | 7/2001 | Morris et al. | 166/312 |

OTHER PUBLICATIONS

U.S. Appl. No. 10/253,962, filed Sep. 24, 2002.
Parlar, M., Brady, M. et al "Filtercake Cleanup Techniques for Openhole Water Injectors With Sand Control: Lessons From Laboratory Experiments and Recommendations for Filed Practices" SPE 77449 presented at the SPE Annual Technical Conference and Exhibition held in San Antonio, Texas Sep. 29, - Oct. 2, 2002.
Morgenthaler L.N. et al. "Optimization of Stimulation Chemistry for Openhole Horizontal Wells" SPE 49098 presented at the 1998 SPE Annual Technical Conference and Exhibition held in New Orleans, Louisiana Sep. 27-30, 1998.

* cited by examiner

*Primary Examiner*—David Bagnell
*Assistant Examiner*—Bryan A Fuller
(74) *Attorney, Agent, or Firm*—Thomas O. Mitchell; Tim Curington; Robin Nava

(57) ABSTRACT

A method is given for completing an interval of an open-hole injection well penetrating a subterranean formation when the interface between the wellbore and the formation includes a zone invaded by a filter cake that includes bridging materials and other embedded solid materials. The method includes the steps of injecting a clean-up fluid and contacting it with the filtercake for a period of time sufficient to loosen some of the other solids embedded in the filter cake; removing the loosened solids by a high-rate displacement fluid containing suspending additives; and then injecting a dissolving fluid containing a diverter and an effective amount of a salt or acid capable of dissolving the bridging material.

23 Claims, No Drawings

METHOD FOR REMOVING FILTER CAKE FROM INJECTION WELLS

BACKGROUND OF INVENTION

This application is based on a provisional application Ser. No. 60/397,188 filed Jul. 19, 2002. The present invention relates to a method for stimulating the completion of hydrocarbon wells in subterranean formation and more particularly, to provide injection wells with an essentially uniform injection profile.

In the recovery of hydrocarbons from subterranean formations, it is a common practice to stimulate the production of a productive wellbore by providing secondary wells in which a fluid, typically water or brine, is injected to increase the formation pressure and displace the hydrocarbons towards the production wells. In this type of recovery operations, it is key to be able to inject large quantity of fluids with a uniform profile to maximize the efficiency of the sweeping up process.

Most of the time, in sand environment, such injection wells are completed open-hole, meaning that in the injection area, the well is not provided with a casing and not perforated. In unconsolidated formations however, sand control measures are implemented to prevent wellbore collapse. Common practice for controlling sand displacement includes uses of standalone screens so that the well collapses around the screen but remains open inside the screen, slotted liners (including expandable screens) or placement of gravel pack to hold formation sand in place. The gravel pack is typically deposited around a perforated liner or screen. The gravel pack filters the sand while still allowing formations fluid to flow through the gravel, the screen and a production pipe.

Although targeted flow rates may sometimes be achieved without any chemical cleanup, it has long been recognized that filter cake cleanup is suitable to improve the injection efficiency. The filter cake is formed during the drilling operation by the build-up of the solid phases present in the drilling fluid and filtered by the formation as the drilling fluid tends to percolate into the formation since an overbalance pressure is often applied which causes fluid loss from the wellbore into the reservoir rock. The filter is actually suitable during the well drilling step since it prevents undesirable leakage of drilling fluids but this impervious barrier is detrimental to suitable migration of fluids such as injection fluids.

The solids constituting the filter cake consist of solid additives such as starches or other type of viscosifying agents, bridging agents such as sized calcium carbonate particles and other drilled solids picked up during the drilling phase such as fines, silt or sand particles.

A treatment with a clean-up fluid followed by stage in which the well is allowed to produce during a certain period is typically desirable to remove the filter cake and maximize infectivity. However, this solution is often not practicable either due to limited storage capacity on the rig or requirement for artificial lift due to low reservoir pressure. Therefore, treatments have to be carried out to remove the filter cakes. Another possibility is to inject a fluid at such a pressure and injection rate that it exceeds the fracturing pressure to bypass the filtercake damage. However, this solution is usually not desirable from a sweep efficiency standpoint or due to premature breakthrough or may not be feasible, e.g. due to very high fracturing pressures or pump limitations.

Numerous chemicals and methods using these chemicals have been proposed to remove filter cakes. These include: aqueous solution with oxidiser present, acid wash solution (mineral acids such as hydrochloric acids or organic acids such as formic and acetic acid), combinations of acid and oxidiser, and aqueous solution with enzymes. Reference is made for instance to U.S. Pat. Nos. 5,126,051 and 5,165,477 that disclose the admixture of enzymes to a drilling mud to promote the enzymatic decomposition of the polymeric organic components of the filter cakes. U.S. Pat. No. 5,881,813 discloses treating injection wells with an enzymatic clean-up fluid to degrade the polymeric viscosifiers and then, perform and acidizing treatment to remove the non-polymeric solids. U.S. Pat. No. 6,263,967 discloses the use of an aqueous wash composition for cleaning up drilling and completion fluid filtercakes comprising water and an effective amount of cationic salts of polyaminocarboxylic acids (such as a di-cation salt of (ethylenedinitrilo) tetraacetic acid), at neutral or acidic pH. The solution may further comprise an oxidizer or enzymes.

For the majority of the recent drilling fluids used in reservoir sections, the acids do not substantially break-down the polymeric component and in fact are used for removal of the calcium carbonate. The oxidizers and enzymes attack the polymers whilst the acids mainly attack the carbonate and polymers. This facilitates the back-production of the filtercake through the screens and limits damage of the completion.

In injection wells however, it has been found that the enzymatic (or oxidizing) treatment followed or combined with an acid treatment is not really satisfying for injection rates. In particular, this type of treatment does not provide a uniform filter cake removal, including drill solids as well as the bridging agents and polymers though this uniform removal is highly suitable to ensure uniform injection profile and maximize infectivity index. This cleaning process is time consuming, costly and often of poor efficiency. It is therefore desirable to provide a new way of completing injection wellbores.

SUMMARY OF INVENTION

This invention proposes a method for completing an interval of an open-hole injection wellbore penetrating a subterranean formation, said wellbore being communicating with the formation by way of an interface that comprises at least a filter cake invaded zone comprising bridging materials and other embedded solid materials, said method comprising the steps of injecting a clean-up fluid and contacting it with the filtercake for a period of time sufficient to loose some of the other solids embedded in the filter cake; removing the loosened solids by a high-rate displacement fluid comprising suspending additives; and then injecting a dissolving fluid comprising a diverter and an effective amount of a salt or acid capable of dissolving the bridging material.

The combination of a treatment to loosen some of the embedded solids and of displacement of these solids prior to treating the well with a dissolving agent, and consequently when the bridging agent is still present and prevents high fluid loss of the high-rate displacement fluid allows spotting of the dissolving solution across a long open hole so that the chemicals will react with the filtercake across the entire interval. In addition, the use of a diverter, preferably a viscoelastic surfactant, ensures contact of the dissolving agent with the bridging particles along the entire open hole.

If a gravel-pack completion is scheduled, the last step of dissolving the bridging agent is preferably combined with the step of providing the gravel. In expandable screen completions, the first two steps (clean-up and high rate displacement) must be conducted prior to expansion of an expandable screen in order to prevent entrapment of the solids between the wellbore wall and the expandable screen. Similarly, these two steps must be conducted prior to gravel packing in order to prevent entrapment of the solids between the wellbore wall and the gravel pack.

To alleviate the difficulties raised by long or inclined intervals, the last stage is preferably carried out with "alternate path" tools. Such tools include perforated shunts adapted to receive the gravel slurry as it enters the annulus around the screen. Those shunts provide alternate paths that allow the gravel slurry to be still delivered even though a bridge forms before the operation is completed. A complete description of a typical alternate-path gravel pack tool and how it operates can be found for instance in U.S. Pat. No. 4,945,991. Several improvements to the operation technique and to the tools have been proposed for instance in U.S. Pat. Nos. 4,945,991; 5,082,052; 5,113,935; 5,341,880; 5,419,394; 5,435,391; 5,476,143; 5,515,915 and 6,220,345. For gravel packed completions that utilize alternate path system, incorporating the bridging agent dissolving chemical (acid, chelating agent or under-saturated brine) in the viscoelastic carrier fluid provides the most attractive and the preferred option, as it combines the gravel packing and bridging agent cleanup treatments into a single step saving rig time as well as providing complete coverage of the open hole. Such a method has been described in U.S. Pat. No. 6,140,277.

The invention provides number of benefits, namely eliminates the need of a long production phase before the use of the well as an injector. A short phase of production is preferred whenever feasible as contingency; however, this stage would be much shorter compared to the production periods and the large production volumes that would typically be required in injector wells, particularly in gravel packed or expandable screen completions, thereby reducing surface storage capacity requirements.

DETAILED DESCRIPTION

The proposed technique pertains to water injection wells in sand control environments that are open-hole completions drilled with a drilling fluid that forms filtercake. The drilling fluid can be either water-based or synthetic/oil-based. The drilling fluids used in the pay zone are called drill-in fluids (DIF) or reservoir drilling fluids (RDF). These fluids contain bridging agents and fluid loss control additives, in addition to viscosifiers, in order to minimize invasion of the pay zone by damaging materials.

The bridging agents used in water-based RDFs are typically solid particles that are dissolvable via exposure to either an unsaturated-brine (e.g., sized salt particles in RDFs utilizing saturated-salt solution as the base brine) or an acid/chelating-agent-solution (e.g., sized calcium-carbonate particles in RDFs that are commonly referred to as polymer/carbonate muds). These bridging agents can also be barite particles which provide higher hydrostatic pressure (for wellbore stability and well control) with lower particle concentrations in the RDF for a given base brine density. Certain types of chelating agent solutions (CAS) can be used to dissolve barite bridging-agents. An additional function of the bridging agents is to provide weight (increased hydrostatic pressure) without requiring more expensive heavier brines.

The bridging agents used in oil-based RDFs are commonly either barite (due to lower density of the base fluid) or calcium carbonate in cases where the reservoir pressure can be balanced without requiring excessive carbonate concentrations. A unique oil-based RDF available from M-I (a Joint Venture of Smith International and Schlumberger) deposits a filtercake that can be reversed to a water-wet condition when exposed to a pH in the acidic range (typically less than 5 to 6). This provides easy access of any water-based dissolution chemicals (e.g., acids or CAS) to the bridging agents such as calcium carbonate or barite used in this oil-based RDF marketed as FAZEPRO.

Fluid loss control additive used in water-based RDFs is typically a starch or starch derivatives. Enzymes such as alpha-amylase have been successfully used for removal of the starch component of the water-based RDF filtercake. Another option is to use oxidizers.

A common approach for cases where removal of both starch and the calcium carbonate components is necessary to achieve high productivities has been a two-step process: an enzyme soak followed by an acid treatment to remove the carbonate bridging agents. In long open-hole completions, such an approach is often ineffective since the reaction of acid with carbonate particles is very rapid, causing carbonate bridging agents to be removed from the regions where they are first exposed to the acid and thus resulting in loss of all the acid into the formation in the already cleaned-up sections of the wellbore. This then results in a wellbore with a clean and thus highly productive section and a dirty (with carbonate particles still blocking pore throats) and thus low-productivity section.

A significant consequence of this is that preferential high flow rates in the clean section leads to a premature water (or sometimes undesired gas) flow into the well, making the well uneconomic due to high water production rates. Although this problem is somewhat less pronounced in standalone screen completions with screens of large enough openings in producing wells, it is a bigger problem in producers gravel-packed with small size gravel, and even a much bigger problem in injectors regardless of the type of completion (i.e., standalone screen, gravel pack). This is because, the bridging agents act like a check valve; and thus they can flow back in production direction in standalone screen environment, considering that the screen openings are sized to stop formation sand particles, which are typically much larger than the bridging agents, or gravel-pack environment when relatively large gravel sizes are used.

An additional and in fact the most critical factor determining infectivity is the presence of drill solids in the filtercake. These are the solids that are not originally part of the RDF but incorporated into the RDF during the drilling process, and thus deposited in the filtercake. The type (clays, silts, quartz, etc.) and size of these particles vary significantly, depending on the formations drilled through as well as the bit type, drilling rates, weight on bit etc. Even when all the polymeric/starch and bridging agent (calcium carbonate, salt, barite, etc.) components of the filtercake are removed with enzymes, oxidizers, under-saturated brines, acids and/or CAS, these drill solids are pushed into the formation and plug the pore throats, severely reducing injectivity, since these solids are insoluble in any of these treatment fluids. Thus, regardless of the type of treatment (i.e., whether it is a single-step CAS/Enzyme treatment or a two-step enzyme followed by acid or oxidizer followed by acid), the drill solids must be removed from the wellbore prior to injection. It is not sufficient to perform an enzyme or an oxidizer soak, and then performing an acid treatment to achieve high injectivities. A high rate displacement stage must be included between the two treatments in order to remove the insoluble drill solids from the wellbore so that they are not injected into the formation.

This invention proposes a novel technique for achieving uniform and high injectivities in wells completed with open holes that cannot be put on production for prolonged time periods prior to injection due to various reasons as discussed above.

For water-based RDFs, the clean-up fluid of the first step of the method, comprises an enzyme or an oxidizer soak in order to hydrolyze the primary polymeric component of the filtercake (starch) that holds the solid particles of the filtercake together, and thus "free" the solids. Suitable enzymes to attack starch include amylases, glucosidases, mannases, galactomannases, hemicellulases, cellulases, xanthanases, scleroglucanases and the like. Alpha amylase enzymes have long been known to hydrolyze starch. An effective amount of enzymes is usually in the range of at least about 10 gallons of alpha-amylase per 1000 gallons of aqueous liquid. Illustrative examples of oxidizers employable herein can include oxidizing agents, persulfates (ammonium persulfate), peroxides, hypochlorites, azo compounds such as 2,2"-azobis(2-amidinopropane)dihydro-chloride and oxidation-reduction systems.

This is then followed by a high-rate displacement stage with an aqueous fluid containing clay-, silt-, sand-suspending agents such as polymer (in particular cellulose derivatives such as hydroxyethylcellulose, guar, xanthan and scleroglucan), and surfactant formulations based on viscoelastic surfactant or others (such as mixture of a hydrochloric acid at 15%, a cationic water-wetting agent and ethylenediaminetetraacetic acid (EDTA), This step, preferably performed using formulations based on a viscoelastic surfactant removes the now loosened solids out of the wellbore. By high-rate, it is meant for instance about 6 to 12 barrels per minute for a 8½ inch hole or of about 3 to 6 barrels per minute for a 6½ inch hole. The annular velocity of the displaced fluid is preferably greater than 30 ft per minute, most preferably greater than 50 ft per minute and in most cases, greater than 100 ft per minute (bearing in mind that high rate displacement may be also achieved by promoting for instance non-laminar circulation). Note that since the bridging agents have not yet been removed, invasion of the formation by the drill solids is either eliminated or minimized during this high-rate displacement stage. High rate is necessary in order to exert sufficient drag to the solid particles that are in the filtercake.

Viscoelastic surfactants, for instance based upon cationic surfactants such as erucyl methyl bis(2-hydroxyethyl) ammonium chloride (hereinafter referred to as "EMHAC") and zwitterionic surfactants such as betaine surfactants may be used. Carrier fluids gelled with viscoelastic surfactants are polymer-free and therefore less likely to damage the oil reservoir.

The first two steps are followed by a third step for removal of the bridging agents, whereby the fluid is used either without any gravel (standalone screen or an expandable screen completion) or with gravel (in gravel packed completion). The first two steps (removal of polymeric components and the high rate displacement) must be conducted prior to expansion of an expandable screen in order to prevent entrapment of the solids between the wellbore wall and the expandable screen. Similarly, these two steps must be conducted prior to gravel packing in order to prevent entrapment of the solids between-the wellbore wall and the gravel pack.

In this third step, a diverter is used to provide diversion of the treatment solution in order to ensure contact of the dissolving agent with the carbonate particles along the entire open hole. Such a diverter is preferably a system based on viscoelastic surfactant though other diverters based for instance on foams or polymer gels diverters can also be used. Again, in this third step, the fluid preferably comprises viscoelastic surfactants. Viscoelastic fluids also contribute to reduce the friction pressure, a point of particular interest since the carrier fluid has to be conveyed along long intervals of pipes of reduced sections.

The dissolving agent can be an acid and/or a chelating agent if the bridging agent is carbonate or an undersaturated brine if the bridging agent is a salt as used in polymer/carbonate or sized-salt reservoir drilling fluids. Suitable acids include mineral acids, preferably hydrochloric acids and other acids that do not significantly react with siliceous formations and organic acids such as formic acid, acetic acid, citric acid, lactic acid, phosphoric acid, phosphonic acid, and tartaric acids. Examples of chelating agents include aqueous solutions comprising di-cationic salts (and preferably di-potassium salts) of ethylenediaminetetraacetic acid (EDTA), cyclohexylene dinitrilo tetraacetic acid (CDTA), [Ethylenebis(oxyethylenenitrilo)] tetraacetic acid (EGTA, also known as Ethylenether) N,N'-tetraacetic acid) and [(Carboxymethyl)imino]-bis(ethylenenitrilo)]-tetra-acetic acid (DTPA, also known as Diethylenetriaminepentaacetic acid), hydroxyethylethylenediaminetriacetic acid (HEDTA) and hydroxyethyliminodiacetic acid (HEIDA), For gravel packed completions that utilize alternate path system, incorporating the bridging agent dissolving chemical (acid, CAS or under-saturated brine) in the viscoelastic carrier fluid provides the most attractive and the preferred option, as it combines the gravel packing and bridging agent cleanup treatments into a single step saving rig time as well as providing complete coverage of the open hole, as discussed in U.S. Pat. No. 6,140,277. The term "gravel" shall be understood as including any particulate material such as sand, bauxite of ceramic beads, eventually resin coated. The size of the gravel should be selected based on conventional criteria; most commonly used sizes being in the range of 20/40 U.S. mesh or 40/60 U.S. mesh.

It is recommended to include a fourth step of a brief production period whenever feasible as contingency, and this stage would be much shorter compared to the production periods and the large production volumes that would typically be required in injector wells, particularly in gravel packed or expandable screen completions, thereby reducing surface storage capacity requirements.

Finally, the initial stages of the injection can include a mutual solvent treatment in dry gas wells in order to break viscoelastic surfactant solution. Examples of suitable mutual solvents include ethylene glycol monobutyl ether, dipropylene glycol methyl ether, dimethyl glycol methyl ether, and other ethers disclosed in the U.S. patent application Ser. No. 10/253,962 filed on Sep. 24, 2002 and in the corresponding International Patent Application PCT/EP02/11807, hereby incorporated by reference. The same approach involving an enzyme or an oxidizer treatment for starch removal, followed by a high rate displacement to circulate out the drill-solids in the loosened cake out of the wellbore, and finally a treatment to dissolve the bridging agents with a viscous solution can also be performed in wells that do not require sand control.

For oil-based RDFs, the proposed method consists of circulating either a base-oil/mutual solvent solution (in either water-sensitive formations regardless of the completion type or wells that will be gravel-packed with an oil-based carrier fluid) or a brine/mutual solvent solution (in wells that will be gravel packed with water-based fluids) in order to break the integrity of and thus loosen the filtercake (this step replaces the enzyme or oxidizer soak proposed for water-base RDFs). Because the bridging agents are not yet removed, the leakoff into the formation will be relatively low, albeit higher than it was prior to this treatment.

This is followed by a high rate displacement using either a viscosified brine (in wells gravel packed with water-based fluids) or an oil-external and water-internal emulsion that does not contain any solids (in water-sensitive formations regardless of the completion type or wells that will be gravel packed with an oil-based carrier fluid) in order to circulate the drill solids out of the wellbore.

The third step is either an aqueous solution that contains a chelating agent solution and a water wetting surfactant along with a mutual solvent (in standalone or expandable screen completions) or an oil-external/water-internal emulsion with a CAS or a low-corrosion organic acid in the internal phase of the emulsion (in either water sensitive formations or in wells that will be gravel packed with an oil-based carrier fluid, latter case including the gravel and thus combining bridging agent removal with the gravel packing process. A mutual solvent injection in water should be performed at the early stages of injection to break any remaining emulsions.

EXAMPLES

Water-Based Reservoir Drilling Fluids

Two commonly used water-based (WB) reservoir-drilling fluids (WRDF) contain a biopolymer and a starch, and either sized-$CaCO_3$ or sized-salt as bridging/weighting agents. In these series of experiments, a 10.4-lb/gal NaCl/KCl-based WRDF with 1.3-lb/bbl biopolymer, 4-lb/bbl starch, and 42-lb/bbl sized-$CaCO_3$ was used. In addition, 8-lb/bbl clays and 10-lb/bbl crushed-sand were added to simulate drill solids. The experimental apparatus was a modified HP-HT fluid loss cell that allows cross-flow over the core face and completion simulation with screens or screen/gravel pack combinations.

Seven experiments were conducted with this water-based reservoir drilling fluids, with the fourth and the sixth experiments conducted according to the invention. A summary of the infectivity experiments is provided in table 1.

In the first experiment, a field core with a brine permeability of 80-md was used to simulate injectivities into the water-leg of the reservoir. A dynamic filtration using the WRDF described above was conducted at 170° F. and 300-psi differential pressure for 4 hours. This was followed by a 16-hour static and a subsequent 1-hr dynamic filtration. The excess WRDF was then displaced with a viscous HEC-pill (~80 lb/1,000-gal) and brine stages at 300-psi overbalance. The core was shut-in for a 36-hr period, considered representative of the trip time. In order to simulate filtercake cleanup through back production without any cleanup, brine was then injected in the production direction, resulting in a retained permeability of 79%. This was followed by measurement of brine permeability in the injection direction, yielding 52% retained. This experiment was performed in the absence of gravel pack.

In the second experiment, another core sample from the same field with a brine permeability of 87-md was used. The dynamic and static mud filtration, as well as the mud displacement were carried out as in the first experiment. This was then followed by installation of 20/40 gravel-pack and a 12-gauge wire-wrap screen. Brine was then injected in the production direction to simulate filtercake cleanup through production, followed by brine injection in the injection direction, allowing determination of post-gravel-pack production retained permeability (78%) and a subsequent brine-injection retained permeability (4%). Furthermore, in order to investigate the impact of a proposed cleanup package, a chelating agent solution (CAS) containing an enzyme was spotted on the mud-cake with a 300-psi overbalance for 2 hours, and the soak was continued at balanced conditions for a further 16-hrs. Immediately following this stage, brine permeability was determined in the injection direction (16% retained). Subsequently, brine was flowed in the production direction and then a final permeability was measured in the injection direction, to determine the impact of back production following the cleanup treatment. This final step resulted in a post-treatment and post-production brine injection retained permeability of 97%.

Note that the retained permeabilities in production direction are the same with or without gravel pack (20/40 U.S. mesh) in the absence of a cleanup treatment: 78 79%. However, the subsequent stabilized, brine injection retained permeability of 4% w/gravel is significantly lower than that in the absence of gravel pack (52%). First, the reason the injection retained-permeability is less than the production retained-permeability in the absence of gravel is because some of the produced filtercake components remaining in the core-holder were re-injected into the core during the injection period. Secondly, in the presence of gravel pack, even though a production retained permeability similar to that w/o gravel can be achieved through redistribution of the filtercake residue within the gravel pack, these redistributed cake components are being reinjected into the core in a subsequent injection period. Note also that the injection retained permeability after the soak with a CAS/Enzyme solution increased from 4 to 16%; notable but not sufficient increase. Subsequently, re-injection following a production period recovered 97% of the original brine permeability.

The third experiment was conducted in order to investigate the effect of a pre-injection production-period for an upcoming water injection well. Since the injection would be into the oil leg, a field core (1.5-in diameter) was first saturated with brine, displaced to residual brine with a mineral oil, followed by displacement to residual oil to establish a base line brine permeability, and finally to mineral oil to reestablish residual brine saturation. A dynamic/static/dynamic mud filtration sequence followed by excess mud displacement with an HEC pill and brine were conducted as in the previous tests. This was followed by placement of a gravel pack slurry (hand-packed) consisting of a carrier fluid comprising a viscoelastic surfactant (VES), a chelating agent CAS and enzyme, and 20/40 gravel with some excess carrier fluid left above the screen (12-gauge Wire-Wrapped) to simulate excess fluid that is left in the base pipe during an actual operation. This fluid was allowed to soak with a 300-psi overbalance at 170° F. for 3 hours followed by a balanced soak for 16 hours. Mineral oil was then injected in production direction for 40 minutes at 6 ml/min. This corresponds to 200-bbls of production at ~7,100 bpd for 40-minutes in a 722-ft, 8.5-in open hole. Subsequent attempt to inject brine into the core resulted in near zero infectivity. Further mineral oil injection in the production direction for a period of 40 hours at the same rate, followed by brine injection initially gave 40% injection retained permeability, which gradually declined to and stabilized at 15%. Note that the production at this stage corresponds to approximately 12,000-bbls at 7,100 bpd for 40 hours. This is a substantial volume. These tests indicated the significance of correctly estimating the required production period prior to injection. In addition, it is clear that the longer the production period, the higher the injection permeability. However, if the production period is not sufficiently long to flow back all the solids out of the gravel pack, re-injection of the solids into the rock will result in poor infectivity. It was clear in this case that a prolonged production period (longer than 40 hrs or equivalent to greater than 12,000 bbls) would be required to establish high infectivity in this well.

Reviewing the experimental results discussed, it is clear that in the absence of drill solids in the WRDF, a single-stage treatment of the filtercake with a solution containing a $CaCO_3$-dissolving chemical and a starch enzyme can yield injectivities on the order of 50–70%. However, identical experiments with the exception of including drill solids in the RDF yield injectivities on the order of 0–5%, depending on the core permeability and the type/size of the drill solids. The results above are independent of whether there is a gravel pack or not.

In the fourth experiment, a field core was originally brine-saturated and then displaced to mineral oil resulting in 87 md to oil. A subsequent brine injection then resulted in a base-line brine permeability of 5.1 md. In order to closely simulate the field conditions, the WRDF filtration was conducted at 2,400-psi differential pressure, dynamically for 4 hours, followed by a static filtration for 16-hours and finally an additional 1-hour dynamic filtration. The test temperature was 170° F., and the WRDF contained 10-lb/bbl simulated drill solids. The excess WRDF was then displaced to a solution containing 5% enzyme in 8.9-lb/gal NaCl-brine, with 950-psi overbalance. This solution was then allowed to soak for 8 hours. Following the enzyme soak, a high-rate displacement was performed by injecting a 2.5% VES solution in brine at 950 psi differential pressure, at an annular velocity of ~150 ft/min. A 20/40 gravel pack slurry consisting of a recently developed VES fluid containing CAS and Enzyme was then placed, and allowed-to soak for 6 hours with a 600-psi overbalance and an additional 72 hours at balanced conditions. Finally, brine injection resulted in an injection permeability of 4.8 md; i.e., a 94% injection retained permeability. The initial stages of injection brine contained a mutual solvent (10%) in order to break the VES fluid and thus speed up the eventual reduction in its viscosity due to dilution vith brine. Thus, a retained injection-permeability equivalent to that obtained in Experiment 2 could be obtained without requiring a production period.

In the fifth experiment, a Berea core of ~512 md brine permeability was used. In order to eliminate relative permeability effects, the core was vacuum-saturated 100% with brine. The RDF filtration and excess mud displacement to HEC-pill and subsequently to brine were both performed in the same manner as in the previous experiments. RDF contained similar drill solids type and concentration. Instead of back flow or a single-stage CAS/Enzyme soak, a two-stage treatment was performed: an enzyme soak followed by a CAS treatment. This resulted in a retained infectivity of 3%, after the CAS soak. The same experiment was then repeated, with the only exception of including a high-rate displacement stage with a viscous fluid (in this case, VES fluid) after the enzyme soak (Experiment 6), followed by a CAS soak as in the previous experiment. This resulted in an injection retained-permeability of ~82%, a substantial improvement over the previous case where the high rate displacement stage with a viscous fluid was omitted.

The last experiment (Experiment-7) utilized a synthetic core plug that was initially vacuum saturated with brine and then displaced to oil, followed by another brine injection stage resulting in a base-line brine-permeability of 30.4-md at residual oil saturation. The test temperature was 180° F. The same WRDF formulation containing the same drill solids type and concentration as in Test-4 was used to form a filtercake statically at 600-psi differential pressure for 16 hours. The excess WRDF was then replaced with a 5% Enzyme solution in 8.9-lb/gal NaCl brine to allow an overbalanced soak (700-psi) for 8 hours. The excess fluid was then removed, and a 20/40 gravel-pack slurry with the same VES/CAS/Enzyme carrier fluid and 12-gauge wire-wrapped screen was placed, with some excess carrier fluid on top of the screen, as in Test 4. The soak was continued at 600-psi overbalance for 6 hours followed by balanced pressure for 72 hours. This was then followed by brine injection, initially containing a mutual solvent (10%) followed by brine only. The resulting brine permeability was 0.8-md; i.e., a mere 2.6% retained injection permeability compared to 94% in Test-4. Note that this experiment closely followed the same procedures as in Test-4, with the only major difference of skipping the high-rate displacement stage between the enzyme and the chelant stages.

TABLE 1

(experiments 4 and 6 includes the high-rate displacement stage according to the invention)

| Experiment | Gravel Pack | Sequence of Events | Retained Injectivity (%) |
|---|---|---|---|
| 1 | None | Brief production; Injection (No cleanup chemicals) | 52 |
| 2. a | 20/40 | Prolonged production; Injection (No cleanup chemicals) | 4 |
| 2. b | 20/40 | (2. a) followed by CAS/Enzyme soak; Injection | 16 |
| 2. c | 20/40 | (2. b) followed by Prolonged production (same period as in 2. a); Injection | 97 |
| 3. a | 20/40 | CAS/Enzyme/VES GP and soak; Brief production; Injection | ~0 |
| 3. b | 20/40 | (3. a) followed by Longer production than (3. a) but shorter than (2. c); Injection | 15 (initially 40) |
| 4 | 20/40 | Enzyme soak; High-rate VES displacement; CAS/Enzyme/VES GP and soak; Injection w/o any production | 94 |
| 5 | None | Enzyme soak; CAS soak (no high-rate displacement after enzyme soak); Injection w/o any production | 3 |
| 6 | None | Enzyme soak; High-rate displacement with VES; CAS soak; Injection w/o any production | 82 |
| 7 | 20/40 | Enzyme soak; CAS/Enzyme/VES GP and soak (no high-rate displacement after enzyme soak); Inject | 3 |

These results demonstrated that the proposed three-stage process allows high-injectivities without any production. For water-based RDFs containing $CaCO_3$ bridging agents, these steps are preferably: (1) Conducting an enzyme or an oxidizer soak to hydrolyze the polymeric components of the cake, which hold the solid particles together; (2) A high-rate displacement stage with a viscous fluid to pick up and transport the solid particles out of the wellbore; and (3) conduct a chemical treatment to remove the bridging agents. In case of gravel packed injectors, the last step can and should be conducted simultaneously with the gravel packing operation in order to ensure complete contact of the breaker with the remaining $CaCO_3$ particles. The second step is preferably conducted with no bridging-agent dissolvers, to keep the bridging agents in pore throats to prevent invasion of the formation with drill solids and to some extent reduce losses, the latter is aided also through the use of a non-damaging viscous fluid, which is completely broken when exposed to a mutual solvent.

Synthetic/Oil Based Reservoir Drilling Fluids

Testing with synthetic/oil-based reservoir drilling fluids (S/OB-RDF) involved linear and radial core tests. Some of the key tests are summarized below.

Linear Core Test

Linear tests have been conducted using a modified HPHT fluid loss cell, allowing cross flow for dynamic filtration and displacements. In the first four tests, Berea sandstone cores of 500 to 600-md (to brine) were used at 150° F. In the fifth test, according to the present invention, a field core of 1,160-md (to brine) was used at 185° F. No gravel packs were used in these tests.

In all tests, 100% brine saturated cores were used. Two oil-based RDFs were tested, a conventional mineral-oil-based RDF and a reversible mineral-oil-based RDF.

The latter system contains a surfactant package that allows the filtercake to reverse its wettability from oil to water, and thus provides access of aqueous dissolution chemicals to the $CaCO_3$ bridging agents that are in the filtercake. Both RDFs contained the same size $CaCO_3$ bridging agents and the same simulated drill solids type (REV dust) and concentration (0 and 25-lb/bbl). The fluid formulations used in these tests are given in Table 2. Note that the differences in $CaCO_3$ and internal brine phase concentrations of the two systems are due to the requirements of identical density (9.5 ppg) and sufficiently close rheology profiles (i.e, viscosity versus shear rate, yield point, plastic viscosity, gel strengths).

TABLE 2

| Materials Added | Conventional OB-RDF | Reversible OB-RDF |
| --- | --- | --- |
| Mineral oil, bbl | 0.682 | 0.529 |
| 10.5-lb/gal $CaCl_2$ bbl | 0.183 | 0.379 |
| Emulsifier-A, lbs | | 12 |
| Oil wetting agent-A, lbs | | 4 |
| Lime, lbs. | 10 | 6 |
| Organophilic Clay, lbs | 8 | 2 |
| Emulsifier-B, lbs. | 3.3 | |
| Oil wetting agent-B, lbs. | 4.1 | |
| Sized $CaCO_3$ (D50 = $2\mu$), lbs | 63 | 42 |
| Sized $CaCO_3$ (D50 = $10\mu$), lbs | 63 | 42 |
| Total $CaCO_3$, lbs. | 126 | 84 |
| Simulated drill solids, lbs | 0 and 25 | 0 and 25 |

In the first four tests, the filtercakes with both RDFs were formed statically with 1,000-psi overbalance for 2 hours. The excess RDF was then replaced with base oil and the filtercake was allowed to soak with 200-psi overbalance for 5 minutes. The excess base oil was then replaced with the breaker solution consisting of 10% acetic acid containing 5% mutual solvent and 0.25% corrosion inhibitor. The breaker soak was performed at 200-psi overbalance for 5 minutes followed by balanced conditions for 1 hour. This was then followed by brine flow in the injection direction. The retained injection permeabilities in the absence of drill solids were 48% with the reversible RDF (Linear Test-1) compared to 0% for the conventional mineral-oil-based RDF (Linear Test-2). These results are consistent with those reported in the literature (see L. N. Morgenthaler, R. I. McNeil, R. J. Faircloth, A. L. Collins and C. L. Davis: "Optimization of Mud Cleanup for Openhole Horizontal Wells," *SPE Drill. & Completion* (March 2000) 14–18.) in that the conventional oil-based drilling fluid filtercakes require not only the proper chemistry but also shear for effective removal of the bridging agents. In contrast, the filtercake of the reversible mineral-oil-based RDF does not require shearing and the bridging agents can be removed through a static soak. Note that this has significant implications for gravel-packed completions, where the filtercake cannot be subjected to shear with the breaker solution after gravel packing.

In the next two experiments, 25-lb/bbl REV-dust was used as simulated drill solids, with everything else being the same as in the first two tests. The resulting retained injection permeabilities were 22% for the reversible RDF (Linear Test-3) versus 0% for the conventional mineral-oil-based RDF (Linear Test-4). Note that a relatively high injection retained permeability observed with the reversible RDF (22%) compared to the results given earlier for the water-based RDFs in the absence of high rate displacements (0 to 3%) is due to the thickness and toughness of the cakes that have been formed over long time periods (in water-based tests) as well as the typically much thinner cakes (and thus much lower mass of solids) formed by oil-based RDFs under identical conditions. Similar tests conducted over long filtration periods typically resulted in retained injection permeabilities in 5 to 10% range with the reversible RDF, utilizing a cleanup treatment but not including a high rate displacement stage prior to bridging agent removal compared to no infectivity at all with the conventional OB-RDFs.

In the last experiment (Linear Test-5), conducted according to the present invention, reversible mineral-oil-based RDF filtration was performed at 400-psi for 8-hours. This was followed by 10-ft/min circulation of base-oil, solids-free RDF, HEC/Mutual-Solvent push pill, brine and finally 10% acetic acid, all stages for 15-minute contact time. Brine injection without any production resulted in 85% retained injection permeability.

The summary of the infectivity experiments with oil-based drilling fluid-linear tests are provided in table 3 below:

TABLE 3

| Experiments | RDF Type | Drill Solids in RDF (lb/bbl) | Sequence of Events | Retained Injectivity (%) |
|---|---|---|---|---|
| Linear 1 | Reversible Mineral-Oil-Based | 0 | Short-term RDF filtration; Static base-oil soak; Static Acid/Mutual-Solvent Soak; Brine Injection | 48 |
| Linear 2 | Conventional Mineral-Oil-Based | 0 | Same as in Linear-1 | 0 |
| Linear 3 | Reversible Mineral-Oil-Based | 25 (REV Dust) | Same as in Linear-1 | 22 |
| Linear 4 | Conventional Mineral-Oil-Based | 25 (REV Dust) | Same as in Linear-1 | 0 |
| Linear-5 (invention) | Reversible Mineral-Oil-Based | 25 (REV Dust) | Long-term RDF filtration Base-oil: 15-mins @ 5–10-ft/min Solids-Free RDF: 15-mins @ 5–10-ft/min HEC/Mutual-Solvent Push Pill: 15-mins @ 5–10-ft/min Brine: 15-mins @ 5–10-ft/min Acetic-Acid: 15-mins @ 5–10-ft/min 3-hrs @ Static conditions Brine Injection | 85 |

Radial Core Test

These series of experiments were conducted using a radial flow model that allows dynamic and static filtration as well as displacements at rates required in field conditions. It also allows placement of various types of screens to simulate sand control completions. In the experiments discussed below, 3-in. internal diameter, 4.375-in outside diameter, and 6-in long aloxite cores were used, with a 2.375-in outside0-diameter pipe placed at the center, allowing an annular velocity of 300-ft/min at 1-bbl/min circulation. The temperature was 150° F. in all tests. Three experiments were performed using a synthetic (ester)-based RDF whose composition is provided Table 4 below. In all experiments, the cores were 100% brine saturated at the start of RDF filtration.

TABLE 4

| Ester Base Oil (bbl) | 0.579 |
|---|---|
| 10 lbs/gal CaCl2 brine (bbl) | 0.156 |
| Organophilic clay (lb) | 1.5 |
| Emulsifier (lb) | 7.0 |
| Fluid loss control agent (lb) | 7.0 |
| Sized CaCO3 (D50 = 5$\mu$) (lbs) | 82.3 |
| Sized CaCO3 (D50 = 5$\mu$) (lbs) | 164.7 |
| Simulated drill solids (lb) | 24.0 |

A synthetic-based RDF formulated at an 11.2-lb/gal density with sized $CaCO_3$ as the bridging/weighting agent, and 24-lbs/bbl REV-dust was added to simulate drill solids. Table-2 shows the composition of the RDF. The initial brine permeability at 100% water saturation was 750-md. The RDF was circulated at 300-psi overbalance for 2-hours with an annular velocity of 150 ft/min, followed by a static filtration period of 18-hours and a brief period of dynamic filtration at the same rate. A 300-psi overbalance was maintained at 150° F. throughout the entire filtration sequence. The excess RDF was then displaced with base oil at a 300-ft/min annular velocity for 15 minutes. This was immediately followed by circulation of the following stages at a 300-ft/min annular velocity for each test:

Radial Test-1: An HEC/Mutual-Solvent Push-Pill, followed by a proprietary mixture containing a Mutual-Solvent, CAS and a Surfactant.

Radial Test-2: The same HEC/Mutual-Solvent Push-Pill, followed by the same proprietary Mutual-Solvent, and Surfactant as in Radial Test-1; excluding the CAS.

Radial Test-3: The same proprietary mixture containing a Mutual-Solvent, CAS and a Surfactant, as in Radial Test-1; i.e., omitting the Push-Pill stage.

Each test included a static soak period with the final fluid stage as specified in the sequences above. In all tests, the final step was brine injection to determine the retained injection permeabilities, which were 57%, 3% and 56% for Tests 1, 2 and 3, respectively.

In addition, the cores were visually inspected after the injection permeability measurements. The best cleanup was achieved in test 1, where a combination of a push pill with CAS/Mutual-Solvent/Surfactant package was used. In Test 3, though the retained infectivity is the same as for Test 1, some filtercake was left on the core face. Indeed, in areas that have not been cleaned, it was found that the filtercake thickness was about the same as the original filtercake thickness prior to cleaning. In field applications, high flow rates near the heel section can result in erosion of some of the external cake in uncleaned sections and deposition on the formation face, thus potentially reducing injectivity. This demonstrates the importance of proper displacement stages, and re-iterates the significance of including viscous push pills.

In Test 2, no external filtercake was left on the core face but the injection retained permeability was extremely poor: a mere 3%. This was the experiment where high rate displacements were conducted properly, but the $CaCO_3$ dissolving chemical (in this case, CAS) was omitted.

The results of the infectivity experiments with a synthetic-based fluids-radial tests are provided in Table 5

TABLE 5

| Test | REV-Dust in RDF (lb/bbl) | Sequence of Events | Retained Injectivity (%) |
|---|---|---|---|
| Radial-Test 1 (inven- | 24 | Base Oil: 15-min @ 300-ft/min; HEC/Mutual-Solvent Push Pill: (15-min at 300-ft/min) | 57 (No external |

TABLE 5-continued

| Test | REV-Dust in RDF (lb/bbl) | Sequence of Events | Retained Injectivity (%) |
|---|---|---|---|
| tion) | | CAS/Mutual-Solvent/Surfactant: (15-min at 300-ft/min and 20-min soak) Inject | cake) |
| Radial-Test 2 | 24 | Base Oil: 15-min @ 300-ft/min; HEC/Mutual-Solvent Push Pill: (15-min at 300-ft/min) Mutual-Solvent/Surfactant: (15-min at 300-ft/min and 20-min soak) Inject | 3 (No external cake) |
| Radial-Test 3 | 24 | Base Oil: 15-min @ 300-ft/min; CAS/Mutual-Solvent/Surfactant: (15-min at 300-ft/min and 20-min soak) Inject | 56 (External cake in some areas) |

These tests clearly demonstrate that high injectivities can be achieved without any preceding production stage with oil-based reservoir drilling fluids as well, following the same principles as discussed earlier for water-based fluids: elimination of the external cake through base-oil and push-pill sequences (as opposed to an enzyme or an oxidizer soak, followed by a viscous fluid for WB filtercakes), and then elimination of the internal cake through a bridging-agent removing treatment (CAS, acetic acid, etc.).

Based on the results above, it was shown that the method according to the present invention allows high injectivity without requiring a production period prior to injection.

What is claimed is:

1. A method for completing an interval of an open-hole injection wellbore penetrating a subterranean formation, said wellbore being communicating with the formation by way of an interface that comprises at least a filter cake invaded zone comprising bridging materials and other embedded solid materials and having not be allowed to produce prior to the completion, said method comprising:
   a) injecting a clean-up fluid and contacting it with the filtercake for a period of time sufficient to loosen some of the other solids embedded in the filter cake;
   b) then removing the loosened solids by a high-rate displacement fluid comprising suspending additives;
   c) and then, injecting a dissolving fluid comprising an effective amount of a salt or acid capable of dissolving the bridging material.

2. The method of claim 1, further comprising a step wherein the well is allowed to produce after the step of dissolving the bridging material.

3. The method of claim 1, wherein the suspending additives of the high-rate displacement fluid is selected among the group consisting of surfactant-based or polymer-based gels.

4. The method of claim 1 wherein the dissolving fluid further comprises a diverter.

5. The method of claim 4, wherein the diverter in the dissolving fluid is selected from the group consisting of viscoelastic surfactant, foams or polymer gel diverters.

6. The method of claim 4, wherein the dissolving fluid is an aqueous base comprising a chelating agent.

7. The method of claim 4, wherein the dissolving fluid is an aqueous base comprising an acid.

8. The method of claim 4, wherein the bridging material is a salt and the dissolving fluid is unsaturated brine.

9. The method of claim 1 wherein the filtercake further comprises oil and the clean-up fluid comprises a mutual solvent.

10. The method of claim 1, wherein the filter cake further comprises polymeric solids and wherein the clean-up fluid comprises one or more enzymes or oxidizers.

11. The method according to any of the preceding claims, wherein the dissolving fluid is injected commingled with a gravel packing fluid.

12. The method of claim 11, wherein the dissolving fluid commingled with the gravel-packing fluid is injected using an alternate-path gravel pack tool.

13. A method for completing an interval of an open-hole injection wellbore penetrating a subterranean formation, said wellbore having not been allowed to produce prior to the completion and being communicating with the formation by way of an interface that comprises at least a filter cake invaded zone, said filter cake formed with a water-based drilling fluids and comprising bridging materials and other embedded solid materials, said method comprising:
   a) injecting a cake-weakening solution including at least one compound selected from enzyme and oxidizer;
   b) then removing the loosened solids by a high-rate displacement fluid comprising suspending additives;
   c) and then, injecting a dissolving fluid comprising an effective amount of a salt or acid capable of dissolving the bridging material.

14. The method of claim 13, wherein said enzymes are selected among the group consisting of amylases, glucosidases, mannases, galactomannases, hemicellulases, cellulases, xanthanases and scleroglucanases.

15. The method of claim 14, wherein the dissolving fluid comprises at least an additive selected from the group consisting of a chelating agent, an organic acid and hydrochloric acid.

16. The method of claim 13, wherein said oxidizer is selected among the group consisting of persulfates, peroxides, hypochlorites, azo compounds and oxidation-reduction systems.

17. The method of claim 13, wherein said suspending additive is selected among the group consisting of surfactant-based and polymer-based gels.

18. The method of claim 13, wherein the step of injecting a dissolving fluid is combined with a gravel packing step.

19. A method for completing an interval of an open-hole injection wellbore penetrating a subterranean formation, said wellbore having not been allowed to produce prior to the completion and being communicating with the formation by way of an interface that comprises at least a filter cake invaded zone, said filter cake formed with a oil-based drilling fluids and comprising bridging materials and other embedded solid materials, said method comprising:
   a) injecting a cake-weakening solution including at least one compound selected from base oil and mutual solvent;
   b) then removing the loosened solids by a high-rate displacement fluid comprising a gelling agent;
   c) and then, injecting a dissolving fluid comprising an effective amount of a salt or acid capable of dissolving the bridging material.

20. The method of claim 19, wherein said gelling agent in the high-rate displacement fluid is a viscoelastic surfactant or a polymer selected among cellulose derivatives, guar, xanthan, scleroglucan.

21. The method of claim 19 wherein said high-rate displacement fluid further comprises a mutual solvent.

22. The method of claim 19, wherein the dissolving fluid comprises at least an additive selected from the group consisting of a chelating agent, an organic acid and mineral acid.

23. The method of claim 19, wherein the step of injecting a dissolving fluid is combined with a gravel packing step.

* * * * *